Figure 1:
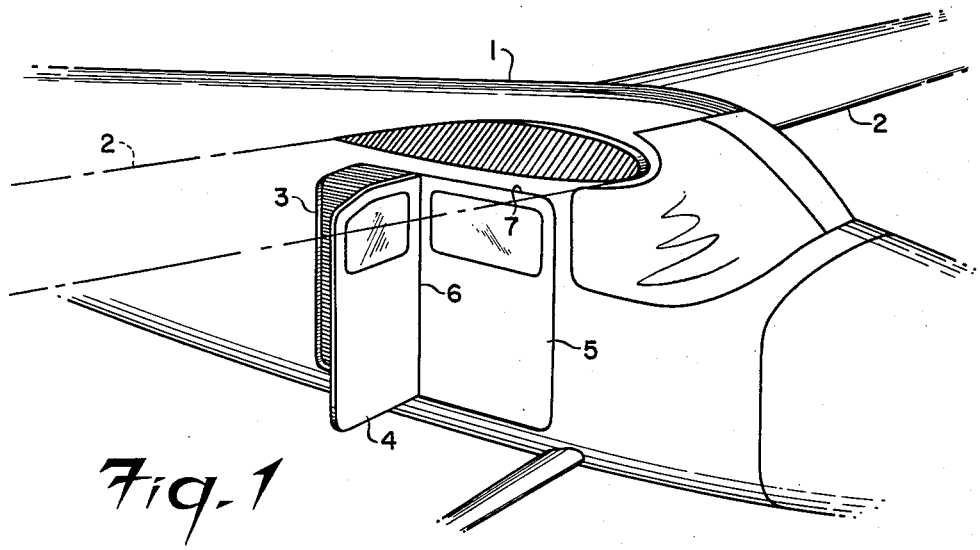

Jan. 28, 1964     W. G. FURRY, JR     3,119,441
MULTI-SECTION AIRCRAFT DOOR
Filed Sept. 1, 1959

INVENTOR.
WARREN G. FURRY, JR.
BY
Agent

United States Patent Office 3,119,441
Patented Jan. 28, 1964

3,119,441
MULTI-SECTION AIRCRAFT DOOR
Warren G. Furry, Jr., Atlanta, Ga., assignor to Lockheed Aircraft Corporation, Burbank, Calif.
Filed Sept. 1, 1959, Ser. No. 837,421
3 Claims. (Cl. 160—212)

This invention relates to aircraft doors, and more particularly to a multiple panel or section aircraft fuselage door wherein a normal size entrance can be converted to an extremely large size opening without substantial weight penalties for maintenance of fuselage structural rigidity and strength.

Doorways or openings through the side surfaces of an aircraft fuselage must through necessity be limited to an area or sizes as small as possible to prevent sacrificing rigidity of the fuselage structure which is occasioned by loss of any type structural members of the fuselage structure that would normally lie in the plane of the doorway or opening in the side of the fuselage. On the other hand, situations arise whereby a much larger opening could be utilized such as for stowage and removal of large bulky cargo in and from the aircraft.

To maintain the structural rigidity of the aircraft fuselage, the load carrying members must likewise through necessity be diverted around the opening resulting in substantial increases in the aircraft weight to maintain the strength and rigidity of the structure. This penalty of increased weight must be tolerated of course for a small type opening which may be completely satisfactory during most uses of the aircraft, but which becomes substantially excessive when an extremely large size opening is provided to permit availability of a sufficient size opening for those situations encountered in use of the aircraft requiring an opening larger than that normally needed.

Accordingly, it is an object of this invention to provide an aircraft door arrangement on the side of an aircraft fuselage capable of permitting a substantially large door opening without sacrificing any strength or rigidity of the fuselage structure.

A further object of this invention is an aircraft door arrangement providing a relatively smaller door opening of sufficient size for normal uses or operation and a relatively larger size opening for handling of large or bulky cargos by the aircraft.

Another object of this invention is to provide an aircraft door arrangement capable of a substantially large size opening while preventing any substantial weight penalties because of the normal structural requirements of the fuselage.

Still a further object of this invention is a door structure and arrangement capable of providing a normal size opening as well as a large size opening for large and bulky cargos that is relatively simple, and inexpensive to manufacture and maintain.

Figure 2:
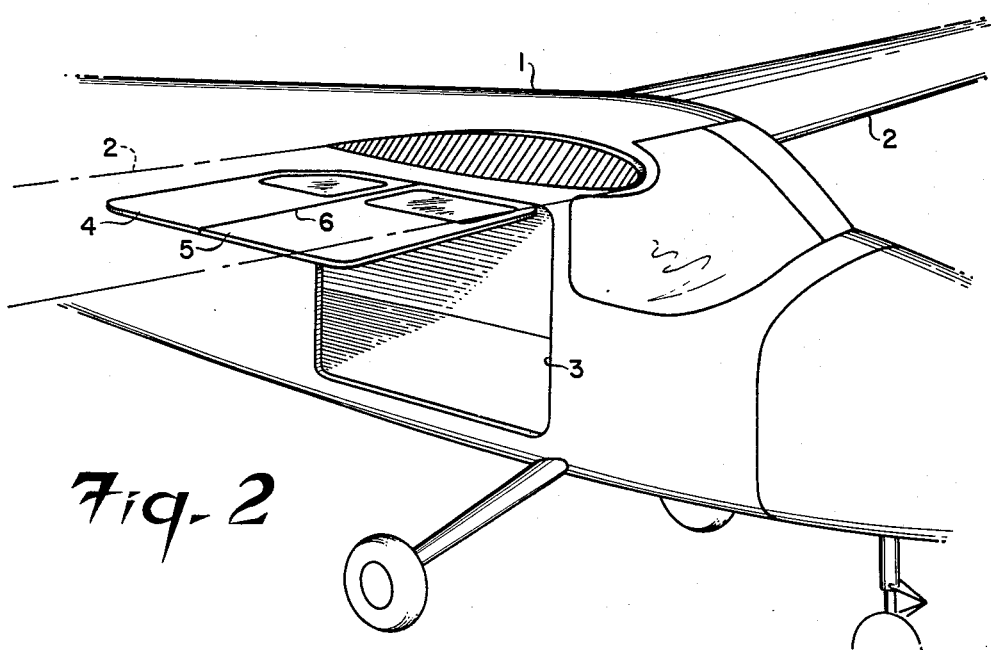

Other objects and advantages will become apparent from the following description taken in connection with the accompanying drawings in which:

FIGURE 1 is a partial perspective view of an aircraft embodying a door assembly of this invention and showing one of the door sections open; and FIGURE 2 is a view similar to FIGURE 1 showing both sections of the aircraft door assembly open.

Generally stated, the invention is practiced by providing a pair of door sections which are hingedly secured together along a vertical axis, the pair of door sections in turn being hingedly secured to the aircraft fuselage along a longitudinal axis the upper portion or edge of one of the door sections.

Referring more particularly to the drawings, there is shown an aircraft fuselage 1 with wings 2 extending therefrom on opposite sides, the starboard or right wing being indicated by phantom lines in the drawings. A door opening 3 is provided in the side of the fuselage for access to the cabin of the aircraft from outside the fuselage 1 which can be closed by a door assembly comprising an aft door section 4 and a forward door section 5. Aft door section 4 is hingedly connected to the forward door section 5 along a vertical axis 6 and forward door section 5 is in turn hingedly secured to the fuselage 1 along a horizontal or longitudinal axis 7 extending along the upper edge of forward door section 5.

When the forward door section 5 is closed as seen in FIGURE 1, door section 5 is connected or secured to the frame of opening 3 along its upper, lower and forward sides by any appropriate fastening or securing means (not shown) whereby the structural loads of the fuselage during flight are also carried by and through the forward door section 5. Whenever the need arises for an opening larger than that provided when only the aft door section 4 is open, the means for connecting or securing the forward door section 5 to the fuselage structure may be unloosened and both the aft and forward door sections 4 and 5 may be swung laterally in an upward direction about axis 7, as seen in FIGURE 2. The aft and forward door sections 4 and 5 may be maintained or held in this position by any appropriate holding or connecting means between the lower, outer portion of forward door 5 and the under surface of starboard or right wing 2 (not shown) so as to provide a free and unobstructed opening of substantially the full area of door opening 3.

Thus it can be seen by providing a dual section aircraft door of a non-load carrying section 4 and a fuselage structural load carrying section 5 there is accomplished a normal sized opening for most circumstances by door section 4 swinging about the axis 6 relative to door section 5 and fuselage 1, while at the same time if a substantially larger opening is desired, the forward door section 5 may be disconnected from the load carrying members of fuselage 1 and both sections 4 and 5 can be swung open to provide a substantially larger opening.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. In combination: an aircraft fuselage having a door opening in the side thereof, a door assembly having a first section pivotally connected along one of its horizontal edges to the fuselage, the planform area defined by the edging of said first section being less than the planform area of said door opening, and a second section pivotally connected to said first section along one of its vertical edges.

2. In combination: an aircraft fuselage having a door opening in the side thereof, a door assembly having a first fuselage structural load carrying section hingedly connected along its upper edge to the fuselage and connectable along its bottom and one vertical side edge to the fuselage when in closed position, the planform area defined by the edging of said first section being less than the planform area of said door opening, and a second section of lighter structural strength relative to said first section, said second section hingedly connected to the other vertical side edge of the first section, said first and second sections completely closing the fuselage door opening when both are in closed position.

3. In combination: an aircraft fuselage having a door opening in the side thereof, a door assembly having a forward section pivotally connected along its top edge to the fuselage, and an aft section pivotally connected along its forward edge to the aft vertical edge of the forward section.

References Cited in the file of this patent
UNITED STATES PATENTS

| | | |
|---|---|---|
| 1,323,177 | Ellison | Nov. 25, 1919 |
| 1,492,485 | Shear | Apr. 29, 1924 |
| 2,610,366 | McKee et al. | Sept. 16, 1952 |
| 2,748,855 | Siems et al. | June 5, 1956 |
| 2,911,211 | Umbricht | Nov. 3, 1959 |